Figure 1:
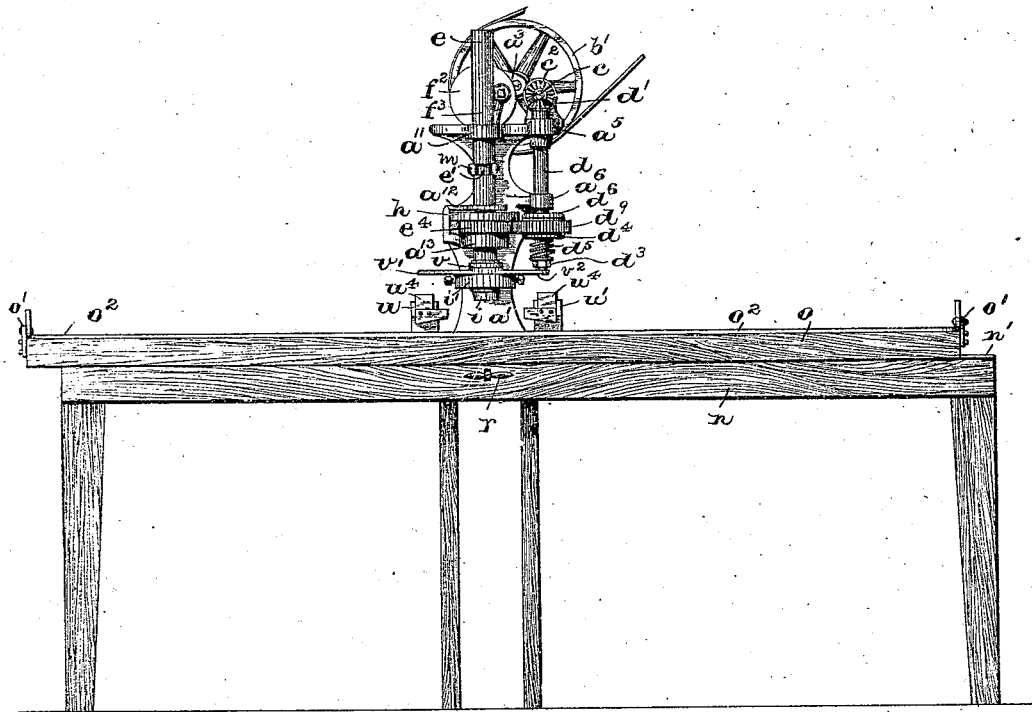

(No Model.) 3 Sheets—Sheet 1.

W. A. MURRAY & J. J. FITZSIMMONS.
CUTTING MACHINE.

No. 551,872. Patented Dec. 24, 1895.

WITNESSES:
W. B. Fraentzel.
Wm. H. Canfield, Jr.

INVENTORS:
WILLIAM A. MURRAY,
JAMES J. FITZSIMMONS. AND
BY
Fred C. Fraentzel,
ATTORNEY (No Model.) 3 Sheets—Sheet 2.

W. A. MURRAY & J. J. FITZSIMMONS.
CUTTING MACHINE.

No. 551,872. Patented Dec. 24, 1895.

WITNESSES:
W. B. Fraentzel.
Wm. H. Canfield Jr.

INVENTORS:
WILLIAM A. MURRAY, AND
JAMES J. FITZSIMMONS.
BY
Fred C. Fraentzel,
ATTORNEY (No Model.) 3 Sheets—Sheet 3.
W. A. MURRAY & J. J. FITZSIMMONS.
CUTTING MACHINE.
No. 551,872. Patented Dec. 24, 1895.
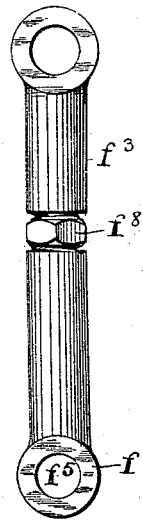
FIG. 11
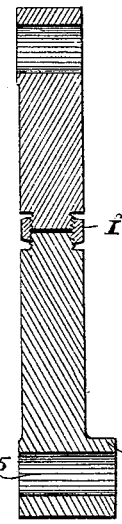
FIG. 12
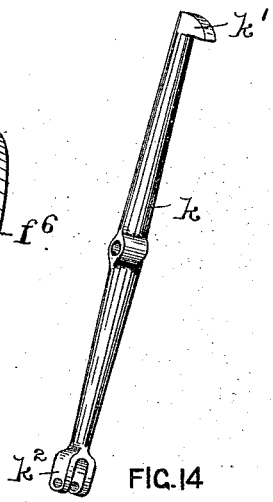
FIG. 13
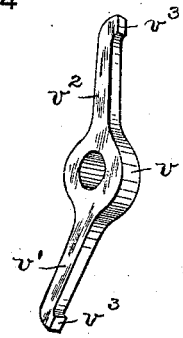
FIG. 14
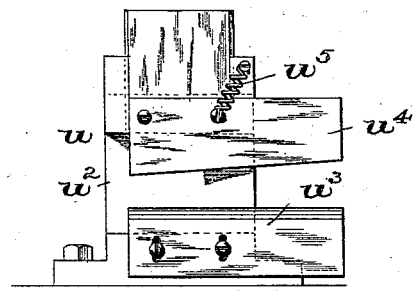
FIG. 15
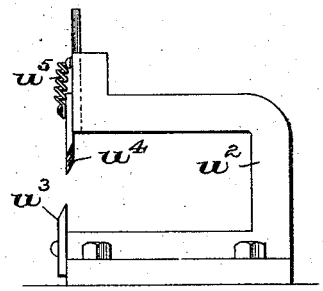
FIG. 16
FIG. 17
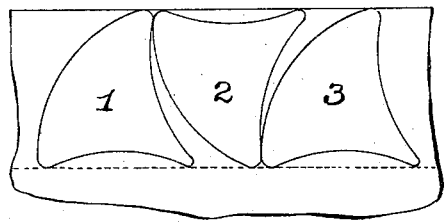
FIG. 18
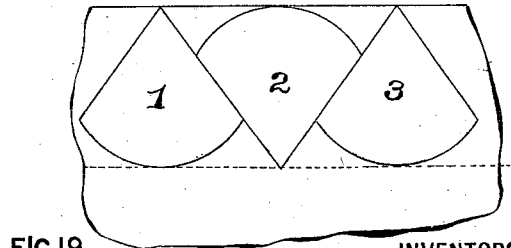
FIG. 19
WITNESSES:
W. B. Fraentzel.
Wm. H. Canfield, Jr.
INVENTORS:
WILLIAM A. MURRAY, AND
JAMES J. FITZSIMMONS.
BY Fred C. Fraentzel,
ATTORNEY

UNITED STATES PATENT OFFICE.

WILLIAM A. MURRAY AND JAMES J. FITZSIMMONS, OF NEWARK, NEW JERSEY.

CUTTING-MACHINE.

SPECIFICATION forming part of Letters Patent No. 551,872, dated December 24, 1895.

Application filed April 4, 1895. Serial No. 544,396. (No model.)

*To all whom it may concern:*

Be it known that we, WILLIAM A. MURRAY and JAMES J. FITZSIMMONS, citizens of the United States, residing at Newark, in the county of Essex and State of New Jersey, have invented certain new and useful Improvements in Cutting-Machines; and we do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

The purpose of this invention is to provide a machine for the cutting of leather skins or hides, or any other material, into pieces of any desirable configuration or outline, which shall be of a simple construction, and in which the material to be cut can be readily mounted and pieces stamped therefrom by means of a rotatable die operated intermittently, to cut the material into pieces without any undue waste or extra handling of the material.

The invention relates, generally, to cutting-machines, and the novelty consists in the construction and various adjustments and arrangements of parts to be hereinafter fully described and claimed, whereby the cutting-die of the machine is first brought down on the material to stamp or cut a piece therefrom and is then raised and turned on its supporting-spindle to bring it, (the die,) when again lowered, in a different position on the material to be cut, alongside of the previously-cut portion. This is the main object of our present invention, whereby the material can be cut into pieces of any suitable shapes, reducing the waste material to a minimum.

The invention consists, furthermore, in certain other arrangements and combinations of parts, such as will be hereinafter fully described, and finally embodied in the clauses of the claim.

The invention is illustrated in the accompanying sheets of drawings, in which—

Figure 2:
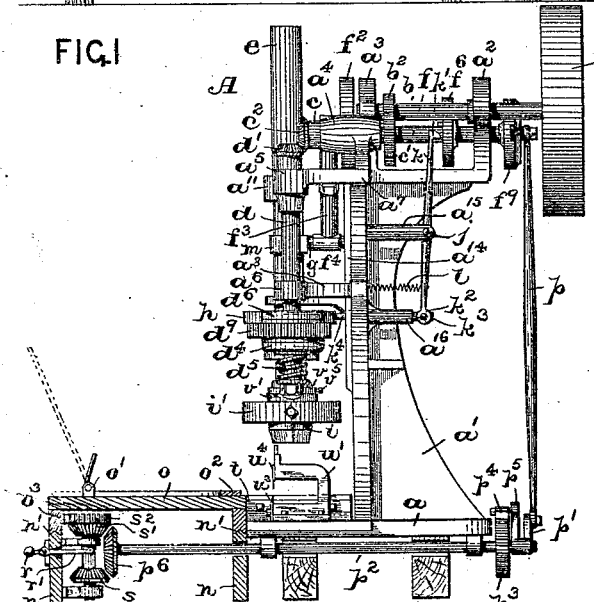
Figure 3:
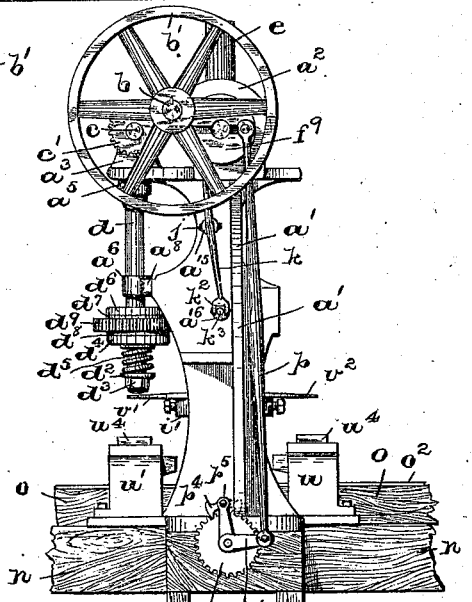
Figure 4:
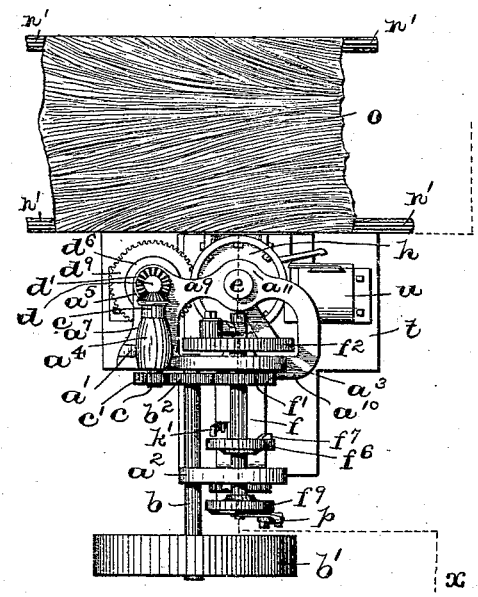
Figure 5:
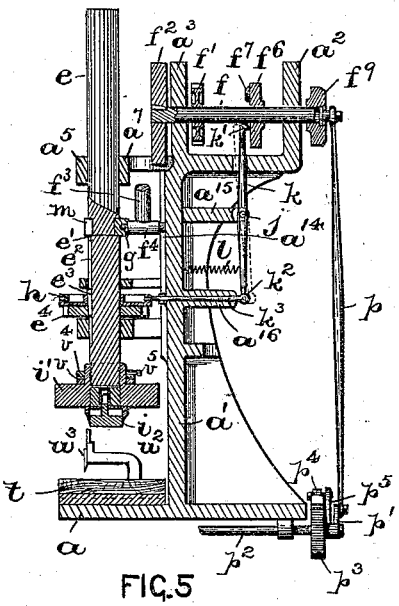
Figure 6:
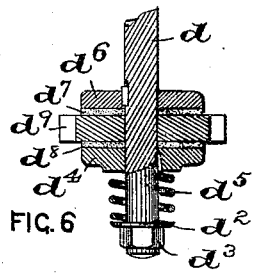
Figure 7:
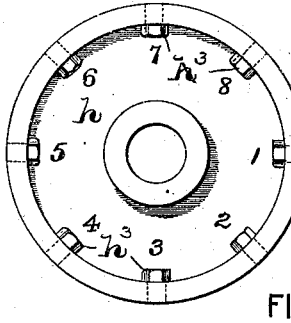
Figure 8:
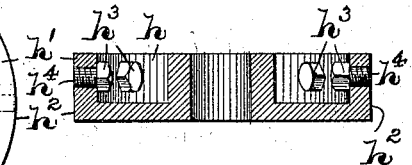
Figures 9, 10:
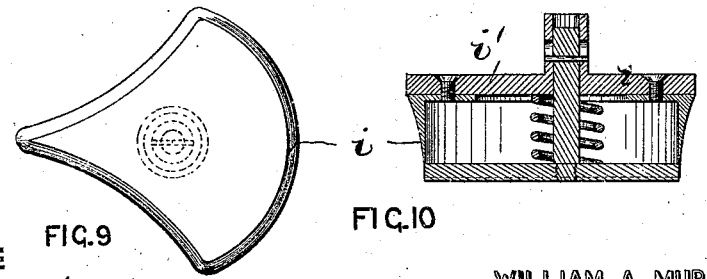

Figure 1 is a front view of our novel form of cutting-machine, and a table or bench in front of the same, provided with a traveling carriage on which the material to be cut is placed. Fig. 2 is a side view of the machine, illustrating the table and its traveling carriage in cross-section, with a pivotally-arranged clamping-arm on said carriage for holding the material to be cut in position on the carriage, and showing in connection therewith a contrivance for causing the traveling carriage to move in either direction in the ways of the support or table of the machine; and Fig. 3 is a back view of the machine. Fig. 4 is a plan view of the machine, and Fig. 5 is a vertical section taken on line $x$ in Fig. 4. Fig. 6 is a vertical section of part of a vertical spindle and a gear-wheel held by friction on said spindle by means of rawhide collars, said view illustrating one means of holding said gear-wheel operatively on said spindle. Fig. 7 is a plan view of an index-disk arranged on the die-supporting spindle, employed to give said spindle and die an eighth or a quarter or a half turn, &c., as may be desired; and Fig. 8 is a vertical section of said disk. Fig. 9 is a bottom view of one form of die for cutting the stock, and Fig. 10 is a vertical cross-section of the same. Figs. 11 and 12 are a side elevation and a longitudinal section respectively of an adjustable link used in connection with the machine for operating the die-holding spindle. Figs. 13 and 14 are perspective views of a disk and a connecting-link, respectively, for operating the index-disk illustrated in Figs. 7 and 8. Figs. 15 and 16 are a front and a side view, respectively, of a trimming-off knife used in connection with the machine; and Fig. 17 is a perspective view of an attachment to be used on the die-holding spindle and adapted to operate said trimming-off knife (illustrated in Figs. 15 and 16) when the die is lowered. Figs. 18 and 19 are diagrammatic views illustrating the lines on which the material may be cut by the rotatable die of the machine.

Similar letters and numerals of reference are employed to indicate like parts in each of the above-described views.

In said views, A represents the complete machine, comprising therein a suitable base $a$ and a standard $a'$, provided with suitable bearings in supports $a^2$ and $a^3$ for the main shaft $b$, having a driving-pulley $b'$ thereon. The shaft $b$ is provided with a toothed wheel or pinion $b^2$, meshing with a gear-wheel $c'$ on the one end of a shaft $c$, that rotates in a suitable bearing $a^4$ on said standard $a'$, while on the opposite end of said shaft $c$ is a bevel-wheel $c^2$. This wheel meshes with a bevel-wheel $d'$, fixed on the upper end of a vertical spindle $d$, which is thus made to rotate in bearings $a^5$ and $a^6$, formed on the arms $a^7$ and $a^8$, extending from the front of said standard $a'$, substantially as shown in Figs. 1, 2, and 3. The lower end of said spindle $d$ is screw-threaded and is provided with a disk $d^2$, held in position by a nut $d^3$. Keyed or otherwise secured on said spindle is a metal collar $d^4$, and encircling said spindle between said disk $d^2$ and the collar $d^4$ is a coiled spring $d^5$. Said spindle is also provided with a collar $d^6$, which is keyed thereto, as shown, or it may be otherwise secured on said spindle, and between two rawhide disks $d^7$ and $d^8$ is placed on said spindle $d$ a gear-wheel $d^9$. At certain times the friction exerted by said rawhide surfaces of said disks $d^7$ and $d^8$ on the opposite sides of the said gear-wheel $d^9$ will cause the latter to rotate with said spindle; but at other times the mechanism co-operating with the die-holding spindle will cause said gear-wheel $d^9$ to remain in a fixed position, while the spindle $d$ turns in the central opening or hole in said gear-wheel and said disks $d^7$ and $d^8$ slide over and against the surfaces of said wheel $d^9$. Extending from said bearing $a^5$ in said arm $a^7$ in front of the standard $a'$ is a frame-piece $a^9$, which is connected with the standard at $a^{10}$, as shown in Fig. 4. Rotatively arranged in a perforated enlargement $a^{11}$ in said piece $a^9$ and in suitable bearings $a^{12}$ and $a^{13}$ is a spindle $e$, which also has a reciprocatory movement in said bearings. Said spindle $e$ is caused to slide up and down in said bearings in the following manner: As will be seen from Fig. 4, said supports $a^2$ and $a^3$ on the top of said standard $a'$ are provided with a second set of bearings, in which is rotatively arranged a shaft $f$ provided with a gear-wheel $f'$ which meshes with the gear $b^2$ on the main driving-shaft $b$ to operate said shaft $f$. On one end of said shaft we have arranged a crank-disk $f^2$ to which is pivotally connected a link $f^3$. The lower end of said link is provided with oppositely-projecting end pieces $f^4$ which are provided with a perforation $f^5$ extending entirely through the same, and in which is placed a pivotal pin $g$, one end of which extends between the vertical guides $a^{14}$ on the standard $a'$ and the other end of said pin $g$ is secured to a fork $m$ placed in an annular groove $e'$ of the said spindle $e$, as clearly shown in Fig. 5. In this manner said spindle receives a reciprocatory movement when the link connected with said spindle $e$ is operated, but owing to the fork-like construction of the part $m$ in said groove $e'$ said spindle $e$ can be made to revolve in its bearings when actuated by the gear-wheel $d^9$ in the manner to be more fully described hereinafter. As clearly illustrated in said Fig. 5, the said spindle $e$ is provided with a longitudinally-arranged groove $e^2$. Fitted to slide in said groove is a key or spline $e^3$, to which is firmly secured a gear-wheel $e^4$ meshing with said toothed wheel $d^9$ on the spindle $d$. Said spindle $e$ is also provided with a similarly-attached cup-shaped index-disk $h$. Thus it will be seen that while said spindle $e$ is capable of an up-and-down movement in its bearings, still at the same time it is capable of a rotary motion in its bearings, caused by the operative engagement of the toothed wheel $d^9$ on the spindle $d$ with the toothed wheel $e^4$, arranged to slide on said spindle $e$, but still being operatively connected therewith. The lower end of said spindle $e$ is screw-threaded and on this thread is secured a suitable cutting-die $i$, which may be of the construction and shape illustrated more particularly in Figs. 9 and 10, but may be of any other well-known construction and shape, as will be clearly evident.

The special construction of cutting-die not forming any material part of our invention, the same need not be further described in connection herewith.

The shaft $f$ is also provided with a disk $f^6$ having a chamfered projection $f^7$ thereon, (see Figs. 5 and 13,) which, once during each revolution of the disk, comes in contact with the chamfered end $k'$ of a rod $k$ pivotally arranged on a pin $j$ between two ears on the free end of an arm $a^{15}$ extending from the back of the standard $a'$ of the machine. The lower end of said arm $k$ is forked, as at $k^2$, and has pivotally connected therewith a rod $k^3$ which is capable of a sliding movement in a sleeve-like extension $a^{16}$, and also on the back of said standard $a'$, and a suitable spring $l$ or other suitable means being employed to cause the free end $k^4$ of said rod to be constantly brought in sliding engagement with the outer surface $h^2$ of the annular flange $h'$ on said index-disk $h$, as clearly illustrated in Figs. 2 and 5. As will be seen from Figs. 7 and 8, said disk $h$ is provided in its annular flange $h'$ with screw-threaded holes, preferably eight in number, into which are screwed certain bolts $h^3$ in the manner shown in said figures, so that the ends $h^4$ of each bolt will be flush with the outer surface $h^2$ of the shoulder or flange $h'$.

Now suppose the die on the spindle $e$ is to be used to cut the pieces of the shape illustrated in Fig. 18. The operator then removes the bolts $h^3$ at 1 and 3 in the disk $h$, which will thus present two openings in the surface $h^2$ of the shoulder $h'$ to the free end $k^4$ of the rod $k^3$, hereinabove mentioned. Suppose the different parts of the machine have been operated and the piece marked 1 in Fig. 18 has been cut from the material. It then becomes necessary on the return or upward movement of the spindle $e$, in order to bring the die $i$ into proper position to cut the piece marked 2 in said Fig. 18, that said die and its spindle shall make a three-quarter turn or revolution. To more clearly demonstrate the operation of the working parts of the machine, we start at the point when the end $k^4$ of said rod $k^3$ is in the hole 3 in the disk $h$ and when the parts of the machine are in their relative positions. (Illustrated in Figs. 2, 3, and 5.) While the spindle $e$ and its cutting-die are traveling or moving down to cut the material, said end $k^4$ is constantly retained, by the action of the spring $l$, in said hole 3 until the piece marked 1 in Fig. 18 has been cut and the parts of mechanism are about to return upwardly. At this time the projection $f^7$ on the disk $f^6$ on the shaft $f$ engages with the end $k'$ of the arm $k$ and thereby withdraws said end $k^4$ of the arm $k^3$ from its holding engagement with the hole 3 in the shoulder $h'$ of the disk $h$. The toothed wheel $d^9$, held by friction between the two rawhide disks $d^7$ and $d^8$ on the spindle $d$, will now cause said spindle $e$ and the parts connected therewith to revolve, while at the same time said spindle moves upwardly, causing the end $k^4$ of the rod $k^3$ to slip along the edge $h^2$ of the shoulder $h'$ of the disk $h$ until it comes opposite the hole at 1, into which the end of said rod $k^3$ is immediately forced by the action of the spring connected therewith. The spindle $e$ and its cutting-die have now made a three-quarter revolution, and on the downstroke of these parts the gear $e^4$ and the disk $h$ will be held in a fixed position, causing the inoperative engagement of the teeth on the wheel $e^4$ with those on the wheel $d^9$, which therefore slips between the two rawhide disks $d^7$ and $d^8$ on the spindle $d$ without interfering with the revolutions of the latter, as will be clearly understood. This allows of the second piece (marked 2) to be cut from the material, as shown in Fig. 18. As soon as this piece has been cut, the projection $f^7$ on the disk $f^6$ again causes the disengagement of the end of the rod $k^3$ from the hole at 1 in the disk $h$, and during the return movement of the spindle $e$ and its parts the gear-wheel $d^9$ will again cause the rotation of said spindle $e$ until the end of the rod $k^3$ is once more forced into the hole at 3, having thereby brought the die to the position to cut piece 3. (Indicated in Fig. 18.) In this manner it will be seen that by removing every bolt in the shoulder $h'$ of the index-disk $h$ the spindle $e$ and its cutting-die can be made to make an eighth of a turn at each upward stroke of the machine, or by removing every other bolt the parts can be made to make a quarter-turn, or, as indicated in the above description, the spindle and die can first be made to make one-quarter turn and then a three-quarter turn.

When it is desired to cut pieces of the shape illustrated in Fig. 19, then the bolts at 1 and 5 in the disk $h$ are removed, and the spindle and die will make half-turns at each upward stroke of the mechanism, as will be clearly evident. Thus it will be seen that by changing the number of holes in the flange or shoulder $h'$ of the disk $h$ any number of combinations may be made to cause the spindle $e$ and its die to rotate or turn intermittently, thereby changing the cutting position of the die $i$ at every downward stroke, and resulting in cutting the material into pieces with a minimum waste of the material. As will be seen from Figs. 11 and 12, the link $f^3$, used for causing the reciprocatory movement of said spindle $e$, is made in two parts, provided with a right and left thread, respectively, onto which an adjusting-nut $f^8$ is screwed, and which operates in the manner as will be clearly understood from an inspection of said Fig. 12. This is shown to illustrate but one form of adjustability of said link $f^3$, and any other well-known forms of adjustable links may be employed.

In order to properly place the material to be cut under the die, we have arranged on suitable ways $n'$ on a bench or table $n$ a traveling carriage $o$. Said carriage is provided with supports $o'$ at both ends for pivotally securing a suitable frame $o^2$ thereto, to hold or clamp the material down upon the supporting-surface of the carriage $o$, as will be clearly understood from Figs. 1 and 2. Said table is made to travel back and forth in the following manner: Adjustably secured to a crank-disk $f^9$ on the shaft $f$ is a connecting-rod $p$, which connects with a suitable crank-arm $p'$ loosely arranged on a shaft $p^2$ adapted to turn in suitable bearings beneath the base of the machine, as shown more especially in Fig. 2. Secured to said shaft $p^2$ is a ratchet-wheel $p^3$, with which can be made to engage a pawl or dog $p^4$ pivotally connected with the arm $p^5$ of the crank-arm $p'$. By this means the operator can make said shaft $p^2$ rotate intermittently and operate in like manner a miter-gear $p^6$ on the end of said shaft. By means of a handpiece $r$ on a pivotal bearing $r'$, either miter-gear $s$ or $s'$ can be made to mesh with said miter-gear $p^6$ on the shaft $p^2$, causing the gear $s^2$ at the top to rotate in either direction at the will of the operator, and by engagement with a toothed rack $o^3$ on the under side of the carriage $o$ said table can be made to travel longitudinally in either direction in front of the cutting-block $t$ beneath the cutting-die of the machine, as will be evident. By this mechanism the traveling carriage $o$ can be moved intermittently to bring a new piece of material to be cut directly beneath the die on the spindle $e$, as will be evident from an inspection of Figs. 18 and 19. On either or both sides of said block $t$ may be placed suitable cutters $u$ and $u'$, which are arranged to cut the material on the dotted lines indicated in said Figs. 18 and 19 to present a straight edge or line on the material for the next cutting operation. These cutters are clearly illustrated in Figs. 15 and 16, and comprise therein a suitable frame $u^2$, adapted to be secured in any well-known manner to the base $a$ of the machine and provided with a knife $u^3$ and a knife $u^4$ movable in ways in said frame $u^2$, a spring $u^5$ being employed to cause the return of said knife $u^4$ to its inoperative position. On said vertical spindle $e$, directly above the collar $i'$ of the cutting-die $i$, we have arranged a suitable sleeve or perforated ring $v$, (see Fig. 17,) provided with two arms $v'$ and $v^2$, each having a projection $v^3$, substantially as shown. Said ring and its arms are held in position on said collar $i'$ on the spindle $e$ by means of a collar $v^4$ and a set-screw $v^5$, as will be seen from Fig. 5. It will be evident that the arms $v'$ and $v^2$ of said ring $v$ can be made to extend directly above the edges of the knives of said cutters $u$ and $u'$ to operate the same on the downward stroke of the spindle $e$ and its cutting-die, and at the same times that the pieces 1, 2, and 3, &c., are cut from the material by the die $i$ said knives $u^3$ and $u^4$ will cut away the waste material, leaving a straight edge on the dotted lines indicated in said Figs. 18 and 19. The arrangement of said collar $v$ and its arms is such that said arms can be turned to one side, whereby but one of the cutters $u$ or $u'$ can be brought into operation, or said cutters may not be used at all, according to the desire of the operator.

From the above description it will be seen that we have devised a cutting-machine in which any suitable material can be cut into any desired shapes, the waste material being reduced to a minimum, and by the arrangement and operation of the parts of the machine dispensing with the arranging and replacing of the material on the cutting-table after each cutting operation, and the die being automatically turned to its proper cutting position, thereby resulting in a great saving of time and labor, as well as a great saving of material.

It is obvious that the precise form and arrangement of parts herein shown are not essential to the present invention, and they may be varied without departing from the scope of our invention. Hence we do not limit ourselves to the exact arrangements and combinations of parts herein shown.

Having thus described our invention, what we claim is—

1. In a cutting machine, the combination, of a machine frame, a vertical spindle arranged in bearings in said frame, a cutting die on said spindle, a second vertical spindle rotatively arranged in bearings in said frame, and means connected with said second spindle for intermittently rotating said die-carrying spindle, substantially as and for the purposes set forth.

2. In a cutting machine, the combination, of a machine frame, a vertical spindle arranged in bearings in said frame, a cutting die on said spindle, mechanism connected with said spindle for causing a reciprocatory movement of said spindle and die, a second vertical spindle rotatively arranged in bearings in said frame, and means connected with said second spindle for causing a rotary motion of said die-carrying spindle on its upward movement, substantially as and for the purposes set forth.

3. In a cutting machine, the combination, of a machine frame, a vertical spindle $e$ arranged in bearings in said frame, a cutting die on said spindle, a gear wheel $e^4$ on said spindle, a second spindle $d$ arranged in bearings in said machine frame, a gear wheel $d^9$ thereon meshing with said wheel $e^4$, and means connected with said spindle $e$, for causing said gear wheels $e^4$ and $d^9$ to be held in inoperative engagement during the downward movement of said spindle $e$, but on the upward stroke, being adapted to release said gear wheels from their inoperative engagement, substantially as and for the purposes set forth.

4. In a cutting machine, the combination, of a reciprocally moving spindle having a die thereon, and means connected with said spindle to cause a rotary movement thereof, a disk $h$ on said spindle having bolts $h^3$ removably arranged in holes or openings in said disk, and means co-operating with said disk to prevent the rotary movement of said spindle, substantially as and for the purposes set forth.

5. In a cutting machine, the combination, of a reciprocally moving spindle having a die thereon, and means connected with said spindle to cause a rotary movement thereof, a disk $h$ on said spindle having bolts $h^3$ removably arranged in holes or openings in said disk, and means co-operating with said disk to prevent the rotary movement of said spindle, consisting essentially, of a shaft $f$ and means for operating the same, a disk $f^6$ on said shaft $f$, having a projection $f^7$, an arm $k$ and a rod $k^3$, adapted to engage with said holes or openings in said disk $h$ from which the bolts have been removed, substantially as and for the purposes set forth.

6. In a cutting machine, the combination, of a reciprocally moving spindle $e$ having a die thereon, a spindle $d$ having a gear $d^9$ loosely, but operatively connected with said spindle $d$, mechanism connected with said spindles $e$ and $d$ for operating the same, a gear $e^4$ on said spindle $e$ meshing with said gear $d^9$ to cause a rotary movement of the spindle $e$ and its die, a disk $h$ on said spindle $e$ having bolts $h^3$ removably arranged in holes or openings in said disk, and means co-operating with said disk to prevent the rotary movement of said spindle, substantially as and for the purposes set forth.

7. In a cutting machine, the combination, of a reciprocally moving spindle $e$ having a die thereon, a spindle $d$ having a gear $d^9$ loosely, but operatively connected with said spindle $d$, mechanism connected with said spindle $e$ and $d$ for operating the same, a gear $e^4$ on said spindle $e$ meshing with said gear $d^9$ to cause a rotary movement of the spindle $e$ and its die, a disk $h$ on said spindle $e$ having bolts $h^3$ removably arranged in holes or openings in said disk, and means co-operating with said disk to prevent the rotary movement of said spindle, consisting essentially, of a shaft $f$ and means for operating the same, a disk $f^6$ thereon, having a projection $f^7$, an arm $k$ and rod $k^3$, adapted to engage with said holes or openings in said disk $h$ from which the bolts have been removed, substantially as and for the purposes set forth.

8. In a cutting machine, the combination, of a spindle $e$ and a die thereon, and means for causing a rotary motion of said spindle and die, consisting essentially, of a spindle $d$, a pair of collars $d^4$ and $d^6$ secured on said spindle, a pair of rawhide disks, and a toothed wheel between said disks, loosely but operatively arranged on said spindle $d$, substantially as and for the purposes set forth.

9. In a cutting machine, the combination, of a machine frame, a reciprocally moving spindle in bearings in said frame, and a die on said spindle, a cup-shaped disk $h$ on said spindle, having an annular flange $h'$ and screw-threaded holes therein, and bolts removably arranged in said holes, substantially as and for the purposes set forth.

10. In a cutting machine, the combination, of a machine frame, a reciprocally moving spindle in bearings in said frame, and a die on said spindle, a cup-shaped disk $h$ on said spindle, having an annular flange $h'$ and screw-threaded holes therein, bolts removably arranged in said holes in said flange, and means adapted to engage with said holes, when the bolts are removed therefrom, consisting essentially, of a shaft $f$, a disk $f^6$ thereon, having a projection $f^7$, an arm $k$ and a rod $k^3$, the free end of which is forced into one of said holes in the flange of said disk $h$, substantially as and for the purposes set forth.

11. In a cutting machine, the combination, of a machine frame, a vertical spindle arranged in bearings in said frame, a cutting die on said spindle, a second vertical spindle rotatively arranged in bearings in said frame, means connected with said second spindle for intermittently rotating said die-carrying spindle, and a reciprocally moving carriage or table connected with said machine, substantially as and for the purposes set forth.

12. In a cutting machine, the combination, of a machine frame, a vertical spindle arranged in bearings in said frame, a cutting die on said spindle, a second vertical spindle rotatively arranged in bearings in said frame, means connected with said second spindle for intermittently rotating said die-carrying spindle, a carriage or table connected with said machine, and means for operating the same, consisting essentially, of a shaft $f$, a crank $f^9$, connecting rod $p$, a crank and pawl, and ratchet wheel, a shaft $p^2$, and gear mechanism operating with a rack on said carriage or table, substantially as and for the purposes set forth.

13. In a cutting machine, the combination, of a machine frame, a vertical spindle arranged in bearings in said frame, a cutting die on said spindle, a second vertical spindle rotatively arranged in bearings in said frame, means connected with said second spindle for intermittently rotating said die-carrying spindle, a carriage or table connected with said machine, and means for operating the same, consisting essentially, of a shaft $f$, a crank $f^9$, connecting rod $p$, a crank and pawl, and ratchet wheel, a shaft $p^2$, and gear mechanism operating with a rack on said carriage or table, comprising therein miter gears $p^6$, $s$ and $s'$, and a shifting lever for causing the operative engagement of either gear $s$ or $s'$ with said gear $p^6$, substantially as and for the purposes set forth.

14. In a cutting machine, the combination, of a machine frame, a vertical spindle arranged in bearings in said frame, a cutting die on said spindle, a second vertical spindle rotatively arranged in bearings in said frame, means connected with said second spindle for intermittently rotating said die-carrying spindle, cutters $u$ and $u'$, and means for operating said cutters, substantially as and for the purposes set forth.

15. In a cutting machine, the combination, of a machine frame, a vertical spindle arranged in bearings in said frame, a cutting die on said spindle, means connected with said spindle for intermittently rotating said spindle and die, cutters $u$ and $u'$, and means for operating said cutters, consisting of a sleeve $v$ adapted to be arranged on said die-carrying spindle, and arms $v'$ and $v^2$ on said sleeve, substantially as and for the purposes set forth.

16. The disk $h$ and its removable bolts $h^3$, combined with a die-carrying spindle, and means for operating said spindle, for the purposes set forth.

17. The disk $h$ and its removable bolts $h^3$, combined with a die-carrying spindle, and means for operating said spindle, consisting of a shaft $f$, crank disk $f^2$, and link $f^3$, substantially as and for the purposes set forth.

In testimony that we claim the invention set forth above we have hereunto set our hands this 30th day of March, 1895.

WILLIAM A. MURRAY.
JAMES J. FITZSIMMONS.

Witnesses:
FREDK. C. FRAENTZEL,
WM. H. CAMFIELD, Jr.